United States Patent [19]

Shaw

[11] 4,406,519

[45] Sep. 27, 1983

[54] PROJECTION SCREEN ASSEMBLY

[75] Inventor: William C. Shaw, Streetsville, Canada

[73] Assignee: Imax Systems Corporation, Toronto, Canada

[21] Appl. No.: 345,840

[22] Filed: Feb. 4, 1982

[51] Int. Cl.³ .............................................. G03B 21/56
[52] U.S. Cl. .................................... 350/117; 160/37; 160/328; 160/378
[58] Field of Search ...................... 350/117, 119, 125; 160/351, 378, 328, 127, 37, 264

[56] References Cited

U.S. PATENT DOCUMENTS

| | | | |
|---|---|---|---|
| 1,901,963 | 3/1933 | Hansen | 350/117 X |
| 2,369,143 | 2/1945 | Hehn | 350/125 |
| 2,486,206 | 10/1949 | Renison | 350/117 |
| 3,037,424 | 6/1962 | Capetta | 350/125 |

*Primary Examiner*—Richard A. Wintercorn
*Attorney, Agent, or Firm*—Rogers, Bereskin & Parr

[57] ABSTRACT

A projection screen assembly is disclosed. The assembly includes a screen which can be lifted into an extended position or lowered into a collapsed configuration for permitting a building in which the screen is installed to be used for other purposes. Lifting means is provided for raising the screen and tensioning it in the vertical direction. Lateral tensioning is effected simultaneously by tensioning elements disposed one adjacent each side edge of the screen. The tensioning elements are coupled to the screen by lateral tensioning members which are of progressively decreasing length in directions extending inwardly from the upper and lower margins of the screen so that the tensioning elements adopt the shape of caternary curves. When the screen is tensioned vertically, these curves are flattened so that the screen is tensioned laterally by the lateral tensioning members.

10 Claims, 8 Drawing Figures

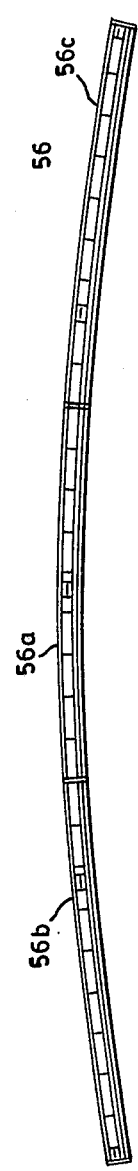
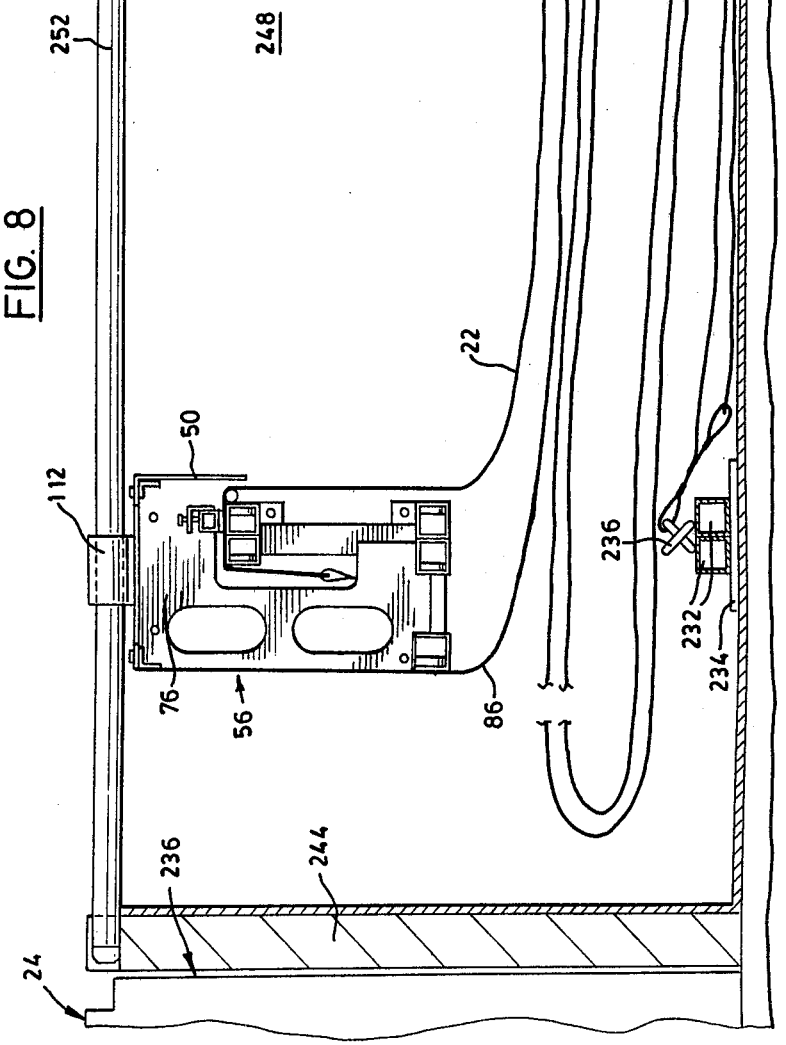
FIG. 5
FIG. 8

PROJECTION SCREEN ASSEMBLY

This invention relates generally to projection screens. In one aspect, the invention is concerned with a projection screen which is stowable to permit a building in which the screen is installed to be used for other purposes.

The invention has been devised primarily (but not exclusively) in connection with screens for use with large format movie projectors of the type known as IMAX (registered trade mark) projectors. Projectors of this general type are disclosed in U.S. Pat. Nos. 3,494,524 (Jones) and 3,600,073 (Shaw). This type of projector is designed for use with relatively large screens, preferably of cylindrically curved configuration.

Several practical problems arise in designing large screens to be stowable. On the one hand, the screen must be collapsible and yet capable of being erected to a configuration in which it presents a projection surface which is substantially free of wrinkles and folds. On the other hand, it may not be possible to employ permanent supporting structure against which the screen can be tensioned when erected, because the supporting structure may well be obtrusive when the screen is collapsed. U. S. Pat. No. 1,901,963 (Hansen) discloses an example of a screen assembly having permanent supporting structure. Other references which were considered in the preparation of this application are as follows: U.S. Pat. Nos.:

783,587 (Nicewaner)
1,522,352 (Wertheimer)
1,674,198 (Edwards)
2,055,511 (Twiss)
2,486,206 (Renison)
2,547,477 (Lewis)
2,754,899 (Karobonik et al.)
2,754,900 (Karobonik et al.)
3,460,602 (Hugus)
3,583,465 (Youngs)
4,072,404 (Brown)
4,156,162 (Christoffel)

An object of the present invention is to provide an improved stowable projection screen assembly. Another object is to provide a projection screen assembly having an improved screen tensioning arrangement.

In one aspect of the invention, the assembly inclues a screen of flexible sheet material capable of adopting an extended configuration in which a surface of the screen is exposed for receiving a projected image, and a collapsed configuration in which the screen can be stowed, the screen having upper and lower margins and lateral side margins. The assembly also includes means for anchoring the lower margin of the screen. Lifting means is also provided and is adapted to be mounted in an overhead position above the anchoring means and to be releasably coupled to the upper margin of the screen. The lifting means is operable to raise the screen into its extended confiration and to tension the screen in a generally vertical direction. The assembly also includes lateral tensioning means comprising respective elongate tension elements, each substantially co-extensive with and spaced from one of said lateral side margins of the screen, and a plurality of lateral tensioning members spaced along the lateral screen margins and extending between the screen and the elongate elements. The tensioning members along each screen side margin are of progressively decreasing length in directions extending inwardly from the upper and lower margins of the screen so that the elongate tensioning elements each adopt the general shape of a catenary curve when the screen is extended, said elongate tensioning elements and lateral tensioning members being arranged so that tensioning of the screen in the vertical direction by the lifting means will cause a consequent increase in tension in the elongate elements tending to flatten said catenary curves and tension the screen in opposed lateral directions.

According to another aspect of the invention there is provided a projection screen assembly including a screen of flexible sheet material capable of being tensioned in an extended configuration in which a surface of the screen is exposed for receiving a projected image, the screen having upper and lower margins and lateral side margins and being anchored at said lower margin. The assembly also includes lifting means supported above the screen and coupled to the upper margin thereof. The lifting means being capable to tension the screen in a generally vertical direction. Lateral tensioning means is also provided and comprises respective elongate tension elements each substantially co-extensive with and spaced from one of the lateral side margins of the screen, and a plurality of lateral tensioning members spaced along the lateral screen margins and extending between the screen elements. The lateral tensioning members along each screen margin are of progressively decreasing length in directions extending inwardly from the upper and lower margins of the screen so that the elongate tensioning members each adopt the general shape of a catenary curve when the screen is extended. The elongate tensioning elements and the lateral tensioning members being arranged so that tensioning of the screen in the vertical direction by the lifting means will cause a consequent increase in tension in the elongate elements tending to flatten the catenary curves and tension the screen in opposed lateral directions.

In order that the invention may be more clearly understood, reference will now be made to the accompanying drawings which illustrate a preferred embodiment of the invention by way of example, and in which:

FIG. 5 is a plan view corresponding to FIG. 2;

Figure 1:
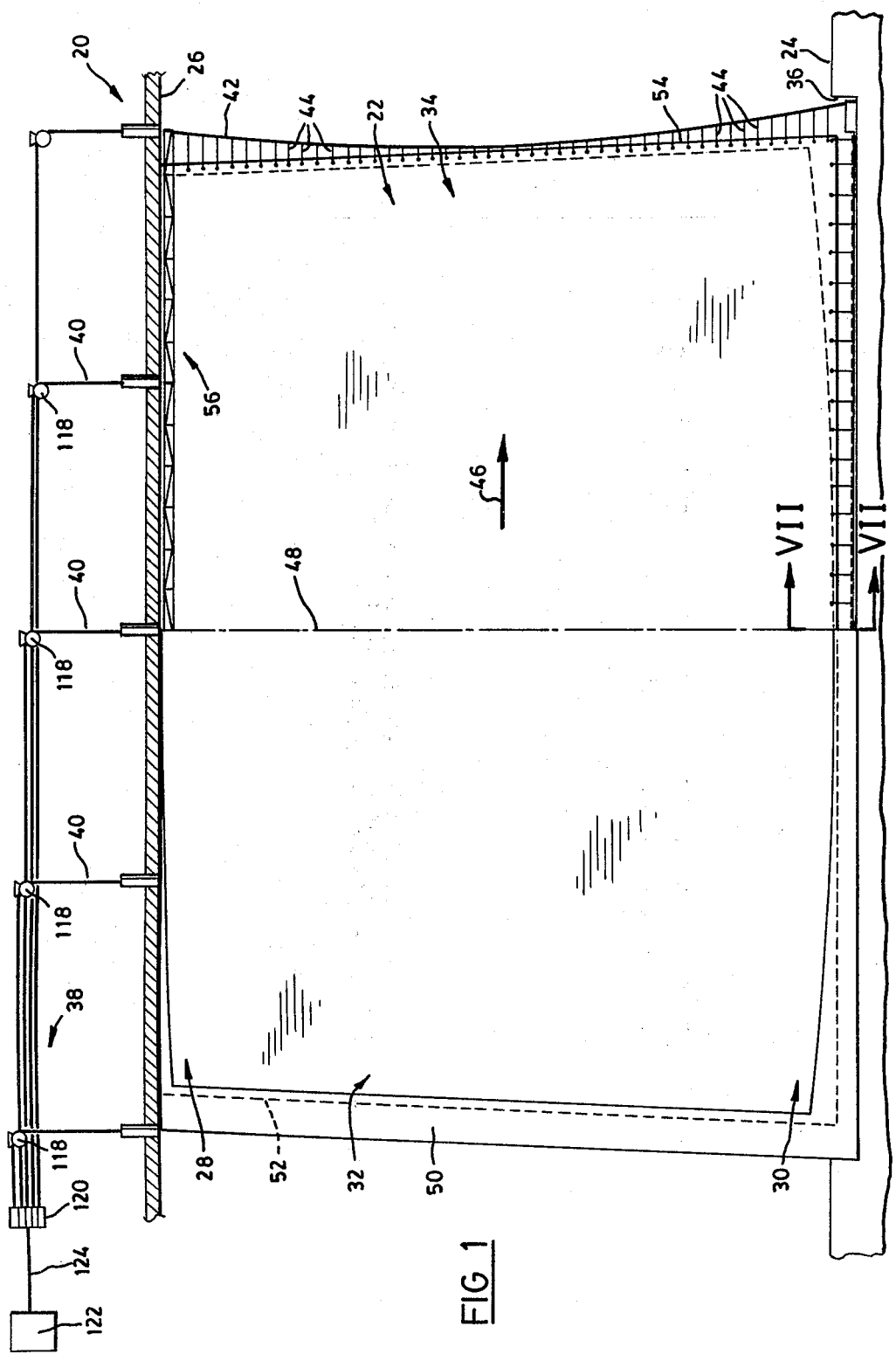
FIG. 1 is a front elevational view of a screen assembly according to a preferred embodiment of the invention with the screen shown in its extended configuration.

Referring first to FIG. 1, the projection screen assembly is generally indicated by reference numeral 20 and includes a screen 22 which extends between a floor surface 24 and a ceiling surface 26, for example in a theatre. The screen is made of a flexible sheet material of the type conventionally used for projection screens (e.g. a vinyl plastic) and is capable of adopting an extended configuration in which it is shown in FIG. 1, in which a front surface of the screen is exposed for receiving a projected image, and a collapsed configuration shown in FIG. 8 (see later) in which the screen can be stowed. The screen has upper and lower margins 28 and 30 respectively and lateral side margins 32 and 34.

A screen storage trough or trench 36 is provided in floor surface 24 and the screen is anchored by its lower margin to the bottom wall of the trough, as will be described more specifically in connection with FIG. 8.

The screen assembly also includes a lifting mechanism or hoist generally indicated by reference numeral 38 which is mounted in the space above ceiling surface 26 and which is disposed generally vertically above the screen storage trough 36. The lifting mechanism includes a series of lifting cables 40 which can be releasably coupled to the upper margin of the screen so that the screen can be raised from its collapsed configuration into its extended configuration and tensioned in a generally vertical direction by means of the lifting mechanism. Lateral tensioning of the screen is achieved by a tensioning arrangement which includes respective elongate tensioning elements, one of which is visible at 42 in FIG. 1. A similar tensioning element is provided adjacent the opposite side edge of the screen but is concealed in FIG. 1. Referring to element 42 by way of example, it will be seen that the element is substantially co-extensive with and spaced from the relevant lateral side margin of the screen. A plurality of lateral tensioning members 44 are spaced along the lateral screen margin and extend between the screen itself and the elongate tensioning element 42. It will be seen from FIG. 1 that the tensioning members are of progressively decreasing length in directions extending inwardly from the upper and lower margins of the screen so that the elongate tensioning element 42 adopts the general shape of a catenary curve when the screen is extended. Element 42 and the lateral tensioning members 44 are arranged so that tensioning of the screen in the vertical direction by the lifting mechanism 38 will cause a consequent increase in tension in the elongate element 42 tending to flatten the catenary curve and tension the screen laterally as indicated by arrow 46 in FIG. 1. A similar arrangement is provided at the opposite side of the screen so that the screen will also be simultaneously tensioned in the opposite lateral direction. In other words, as the screen is tensioned in the vertical direction by the lifting mechanism 38, the two curved elongate tensioning elements at respectively opposite sides of the screen are simultaneously tensioned, tending to flatten the curves defined by the respective elements and thereby tension the screen in opposed lateral directions by way of the lateral tensioning members 44 and the corresponding members at the opposite side of the screen.

In FIG. 1, the vertical centre line of the screen is denoted 48. The portion of the screen to the right of centre line 48 as drawn is exposed to show the tensioning element 42 and members 44 and associated structure (to be described) while the portion of the screen to the left of centre line 48 is provided with a peripheral mask 50 which covers the corresponding structure at that side of the screen. In practice, the mask 50 will extend around the entire periphery of the screen so as to present a "clean" surface for receiving a projected image. Mask 50 is made of an optically opaque material and is shaped to correspond with the shape of the screen and provide a masked peripheral area of the required configuration. The lateral edge of the screen behind mask 50 is indicated by the dotted line denoted 52 while the corresponding edge at the opposite side of the screen is denoted 54. It will be noted that the edges 52 and 54 are not parallel but inclined towards one another slightly towards the top of the screen. This shape is adopted because of the particular relative orientation between the screen and the projector required in the particular application for which the screen is designed and may not be necessary in all applications. In this particular application, the projector is disposed somewhat above a horizontal plane passing through the centre of the screen so that the projected image tapers slightly towards the top of the screen.

The screen is also cylindrically curved about a vertical axis to the general shape shown in FIG. 5. FIG. 5 is a plan view of a beam 56 from which the screen is suspended by its upper margin (see also FIG. 1). Details of the beam construction are shown in FIGS. 2, 3, 4 and 5, which views will now be more specifically described.

Figure 2:
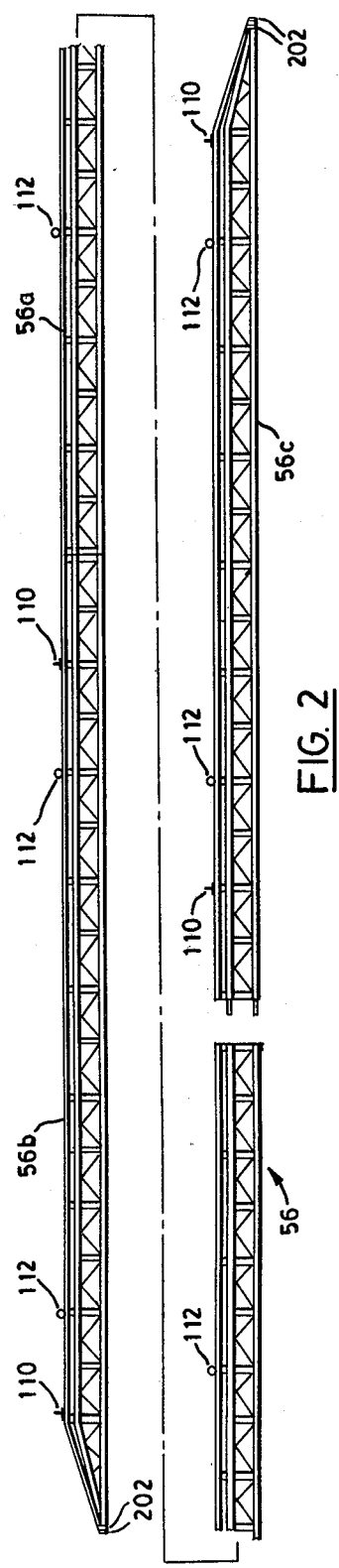
FIG. 2 is a front elevational view of a beam used at the upper end of the screen as seen in FIG. 1.
Figure 3:
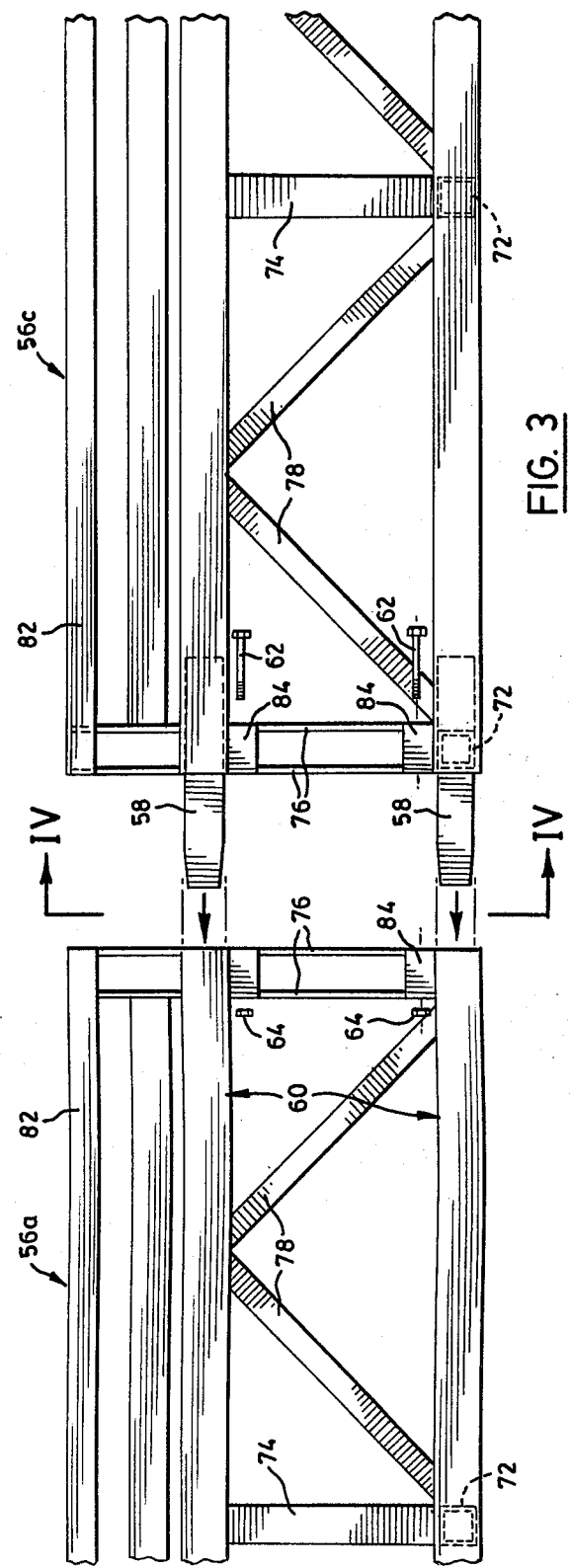
FIG. 3 is an enlarged detail view showing parts of the beam of FIG. 2 separated.

FIG. 2 is an elevational view of the beam itself while FIG. 5 is a plan view (on a smaller scale) showing the lateral curvature of the beam. Beam 56 is made in three sections and includes a centre section 56a and two end or "wing" sections 56b and 56c. The three sections are essentially the same except that the end sections 56b and 56c have tapered outer ends as shown; however, these sections need not be tapered. The three sections are coupled together by pin and socket couplings as best seen in FIG. 3. That view illustrates the coupling between end section 56c and the centre section 56a. Two tapered "pins" 58 project laterally inwardly from section 56c and are received in the open ends of corresponding box section members 60 of section 56a. Bolts 62 and corresponding nuts 64 are used to secure the sections together. A corresponding arrangement is provided between centre section 56a and section 56b but is not shown in the drawings.

Figure 4:
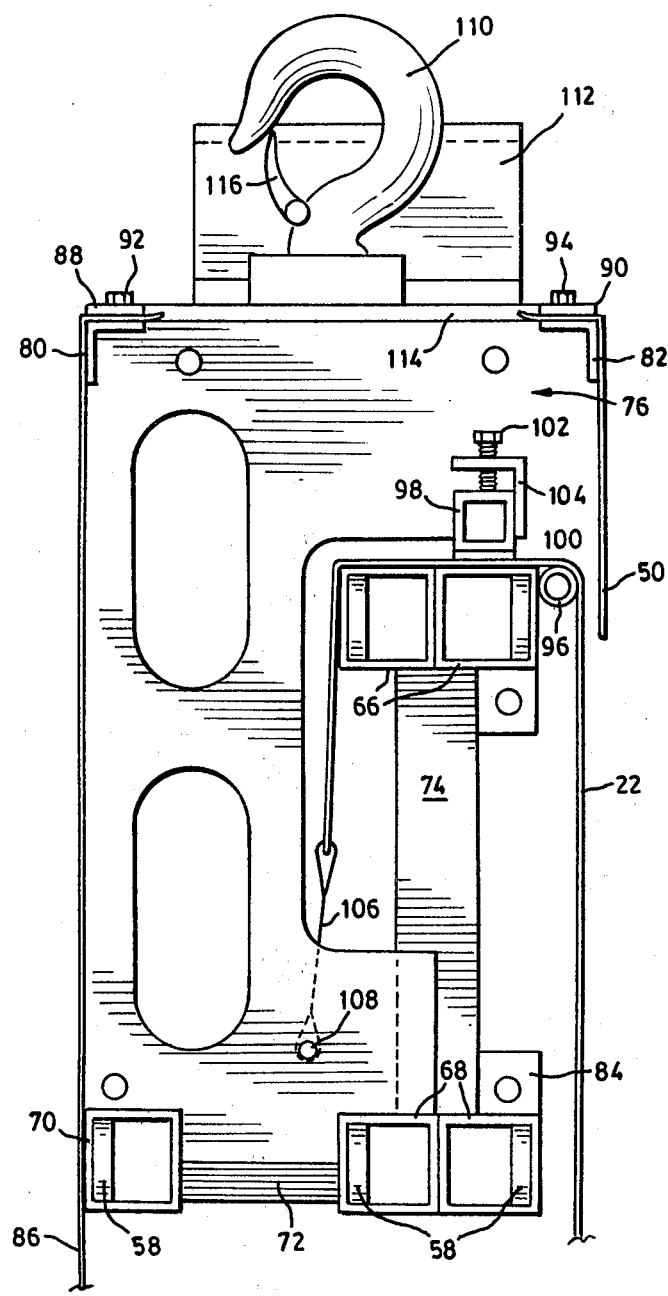
FIG. 4 is a sectional view on line IV—IV of FIG. 3.

FIG. 4 is a view in the direction of arrows IV—IV of FIG. 3 and illustrates the cross-sectional shape of the sections which make up the beam. FIG. 4 may be considered as representative of all of the beam sections except in that it shows the "pins" 58. It will be seen that these "pins" are in effect narrow rectangular plates welded inside box section members which form the main longitudinal members of the beam section. These members are also shown in FIG. 3 and are designated by reference numeral 60. If will be seen from FIG. 4 that there are in fact five such members arranged in a generally triangular configuration and comprising a first pair of members 66 welded together side by side and disposed in an upper position, a similar pair of members 68 disposed below the members 66, and a single box section member 70 disposed at a lateral spacing from and parallel to the bottom pair of members 68. Short struts 72 (also of box section) extend between members 70 and the inner one of the members 68 and are welded to the members. These struts are spaced at intervals along the relevant section. Similar vertical struts 74 (see FIG. 3) extend between the lower box section members 68 and the upper members 66 at intervals along the section as can best be seen from FIG. 2. Intermediate each pair of vertical struts 74 are a pair of spaced plates 76 and a pair of inclined bracing struts 78 extend between each pair of plates and the adjacent vertical struts 74 as seen in FIG. 2. The shape of one of the plates 76 is shown in FIG. 4.

Referring to FIG. 4, it will be seen that plate 76 is generally of C-shape with rectilinear top and rear edges disposed mutually at right angles. A pair of angle-section members 80 and 82 extend along the top of the beam and are welded to the plate 76 adjacent the top edge of the plate. It will be seen from FIG. 3 that the plates 76 are in fact arranged in pairs with the plates in each pair relatively closely spaced and separated by fillet plates 84. The angle section members 80 and 82 serve as anchor points for a backdrop 86 and for the mask 50 referred to in connection with FIG. 1. The screen itself is indicated at 22 and is suspended from the upper pair of box section members 66 as will be described. Backdrop 86 is made of an optically opaque material and is provided to absorb light passing through the screen 22. Backdrop 86 is necessary in applications in which screen 32 is perforated as will normally be the case with an IMAX (registered trade mark) projection system in which loud speakers are positioned directly behind the screen. In any event, the backdrop 86 and the mask 50 are draped over the respective angle section member 80 and 82 as shown and are secured in place by respective plates 88 and 90 secured to the angle section members by bolts 92 and 94 passing through openings in the backdrop and mask respectively. The plates 88 and 90 are co-extensive with the angle section members 80 and 82 although smaller plates could of course be used.

Screen 22 is draped over the upper box section members 66 of the beam as shown and a circular tube 96 is welded to the outer member 66 adjacent its outer corner so as to provide a radiused bearing surface for the screen for minimizing damage. A clamping bar 98 of box section metal tubing is provided above the top surface of the outer member 66 and has a rubber pad 100 on its lower surface for clamping the screen to member 66. Bar 98 is urged against the screen by a series of bolts 102 which bear against bar 98 at their ends and which are received in complimentarily screw-threaded openings in an angle section bracket 104 welded to the plates 76 parallel to members 80 and 82. A series of anchor cables 106 are looped through openings adjacent the outer edge of the screen and around an anchor bar 108 for positively securing the screen to beam 56. Grommets are provided in the openings but are not shown in the drawings.

Beam 56 is provided along its top surface with a series of lifting hooks which are denoted by reference numeral 110 in FIG. 2, and one of which is visible in side view in FIG. 4. Also spaced along the top of the beam between the lifting hooks are a series of short cylindrical tubes 112, one of which is also visible in FIG. 4. Each of the hooks 110 is welded to a support plate 114 bolted to the respective angle section members 80 and 82 in the same manner as the plates 88 and 90. Each hook has a pivoted latch 116 which is spring-biassed into the position shown in the drawings, in which it closes the hook. The hooks are positioned to correspond with the positions of the lifting cables 40 (FIG. 1) and the cables have eyes at their lower ends which can be engaged with the hooks as will be described in connection with FIG. 6. The tubes 112 are similarly welded to support plates bolted to the angle section members 80 and 82 and are positioned to receive bars for supporting the beam when the screen is in its collapsed condition as will be described in connection with FIG. 8.

Referring now to the lifting mechanism of the screen assembly, FIG. 1 shows the general layout of the assembly in diagrammatic form. The lifting cables 40 extend vertically upwards from ceiling surface 26 and around respective fixed pulleys 118. From the pulleys 118, the cables all extend horizontally to a common clew 120. The clew is movable to raise and lower the cables by means of an electric winch 122 coupled to the clew by a cable 124. It will of course be appreciated that FIG. 1 shows the arrangement in diagrammatic form only; obviously, the relative dispositions of the winch 122, clew 120 and the pulleys 118 will have to be sufficient to allow the lifting cables 40 to lower the screen to its fully collapsed position. Also, in practice, the winch will probably be disposed substantially on the centre line of the screen so that the lengths of the respective lifting cables will be substantially equal.

Figure 6:
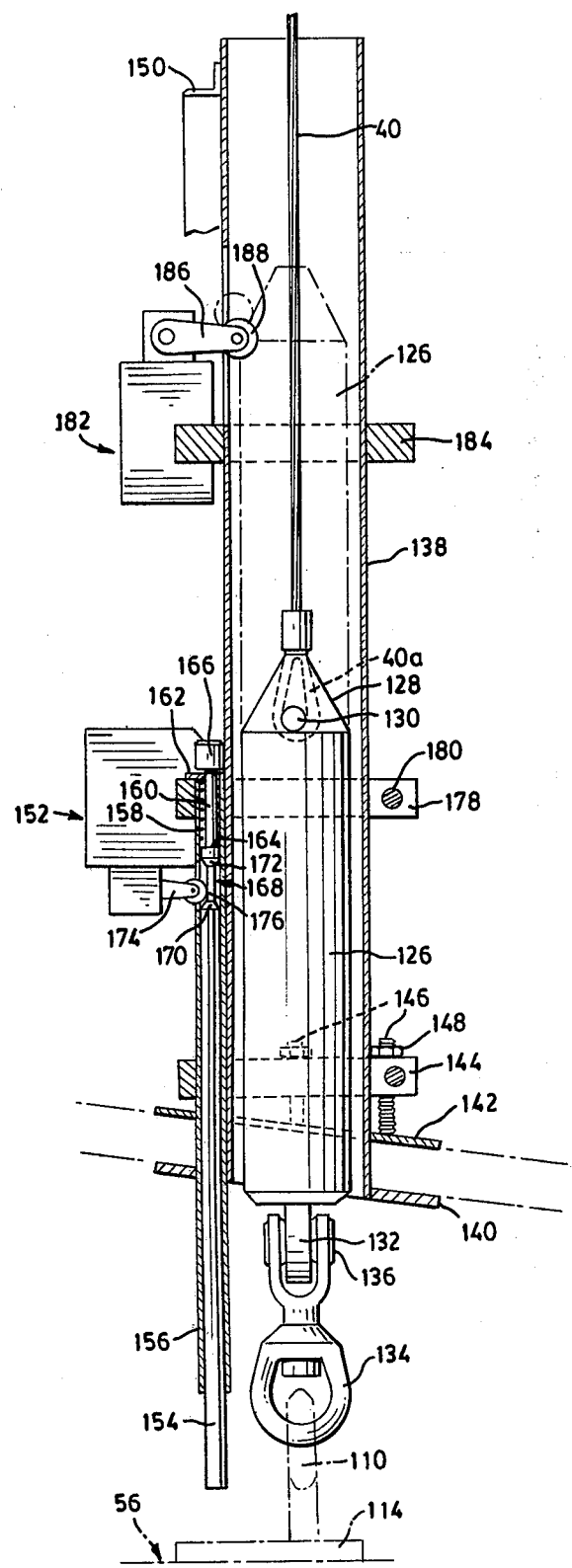
FIG. 6 is a vertical sectional view through part of the lifting apparatus of the screen assembly.

Reference will now be made to FIG. 6 which shows a lower end portion of one of the lifting cables 40 disposed in the vicinity of the ceiling surface 26. It will be seen that the cable is in fact provided with a weight 126 at its lower for the purpose of ensuring that the cable can be lowered substantially vertically even when it is not attached to the screen. The weight 126 is generally of cylindrical shape and has a conical upper end portion 128 formed with a diametral slot receiving a loop 40a at the lower end of cable 40. The loop passes around a retaining pin 130. At its lower end, a lug 132 depends from the weight and provides an attachment point for a lifting eye 134 suitable for engaging the relevant one of the lifting hooks 110 on beam 56. The hook is shown in ghost outline in FIG. 6. It will be seen that eye 134 has a forked upper end coupled to lug 132 by pivot pin 136.

A cylindrical tube 138 is incorporated in the ceiling surface 26 at the position of each of the cables 40 and extends generally vertically upwardly from the ceiling surface so as to form a "pot" or housing for the weight. A disc 140 is welded to the lower end of tube 138 at an inclination appropriate to the inclination of the ceiling surface 26. A similar disc 142 which is free of attachment to tube 138 is provided on top of the ceiling surface and a collar 144 welded to tube 138 is braced against disc 142 by three adjustable threaded rods, two of which are visible at 146, and each of which is provided with a lock nut 148. Obviously, by adjusting the rods 146, the tube can in effect be clamped to the ceiling surface 26 and then secured in place by locking the nuts 148. In this way, the clamping arrangement can be adjusted for different ceiling thickness. The tube is also braced at its upper end by an angle section member 140 secured to the permanent structure above ceiling surface 26 in the building.

The weight 126 is shown approximately in the position it will adopt when the screen has been lifted to its fully erected position. This position is determined by a limit switch to be described later in connection with FIG. 7. In addition, safety override limit switches are provided in association with each of the tubes 138. One of these switches is shown in FIG. 6 and is denoted 152. A switch actuating probe 154 is axially slidable in an outer sleeve 156 secured to tube 138 so that the lower end of the sleeve protrudes below the ceiling surface 26. In turn, probe 154 protrudes below the lower end of the sleeve and is positioned for contact with the support plate 114 of the lifting hook 110 on beam 56 in the event that the beam is lifted beyond its normal position with the screen fully erected.

Probe 154 is oriented with its axis parallel to tube 138 and, accordingly, is substantially vertical. Thus, the probe is displaced vertically upwardly by plate 114 if the beam approaches ceiling surface 26. The probe is biassed downwardly by a spring 158 which extends around a portion 160 of the probe of reduced diameter and which acts between an upper end wall 162 of sleeve 156 and a shoulder surface 164 at the lower end of the portion 160 of reduced diameter. Above wall 162, probe 154 is provided with an enlarged head 166.

Immediately below this portion 160 of reduced diameter is a further portion 168 which is also of reduced diameter and which has respective conical surfaces 170 and 172 at the ends thereof. This portion of the probe is used to operate the limit switch 152. Thus, the limit switch has an actuating lever 174 which extends through an opening in sleeve 156. A roller 176 at the outer end of lever 174 rides on this reduced diameter portion 168 of probe 154. It will of course be appreciated that axial displacement of probe 164 in either direction will cause roller 176 to ride up the relevant one of the conical surfaces 170 and 172 and actuate the limit switch.

Limit switch 152 and housing 156, together with its probe 154 form a unit which is secured to tube 138 by a collar 178 clamped around tube 138 at the appropriate vertical position. Sleeve 156 also passes through an opening in collar 144 for location purposes. The limit switch/probe combination is positioned appropriately along the length of tube 138 so that the limit switch is operated by contact with the beam only if the beam is lifted above its normal position in which the screen is fully extended. Limit switch 152 is connected in the control circuit for the electric winch 122 (FIG. 1) so that the winch will stop at this time and accordingly provides a safety override in case of failure of the screen positioning switches (see later) or other parts of the apparatus. In fact, the circuitry is arranged so that the winch will stop as soon as any one of the limit switches associated with the respective cables 40 has been actuated.

The limit switch/probe combination is vertically adjustable on tube 138 by virtue of the fact that collar 178 is a split collar. The portions of the collar are secured together by a nut and bolt coupling, part of the bolt of which is visible at 180 in FIG. 6. Since the probe sleeve 156 is slidable in the lower collar 144, adjustment of the position at which limit switch 152 is operated can be affected simply by releasing this clamping bolt and sliding the limit switch/probe combination along tube 138.

A second limit switch 182 is permanently secured to tube 138 above limit switch 152 by a collar 184 welded to tube 138. This limit switch has an operating lever 186 with a roller 188 at its outer end positioned for contact with the conical end portion 128 at the top of the weight 126. In FIG. 6, the weight is shown in ghost outline in an upper position in which surface 128 has operated limit switch 182. This is a "stowed" position of weight 126 when the screen is stowed in its collapsed configuration. Thus, starting from the position shown in FIG. 6, the screen is first lowered by appropriately operating winch 122 until the screen has been stowed. The eyes 134 associated with each lifting cable 40 are then disengaged from their respective lifting hooks 110 and the cables 40 are lifted by winch 122. However, the override limit switches (as 152) will not be operated because beam 56 will have been detached from the lifting cables.

The weight 126 will accordingly continue to move up tube 138 until it operates limit switch 182 as described above. Limit switch 182 is also connected into the electrical control circuitry for the winch 122 so that the winch will stop at this time and the lifting cables 40 will be effectively stowed within the tubes 138 with the weights 126 and lifting eyes 134 concealed. Accordingly, the only structure which will be visible below the ceiling surface will be the probe 154 and the opening at the lower end of tube 138, and these elements will obviously be relatively unobtrusive.

Figure 7:
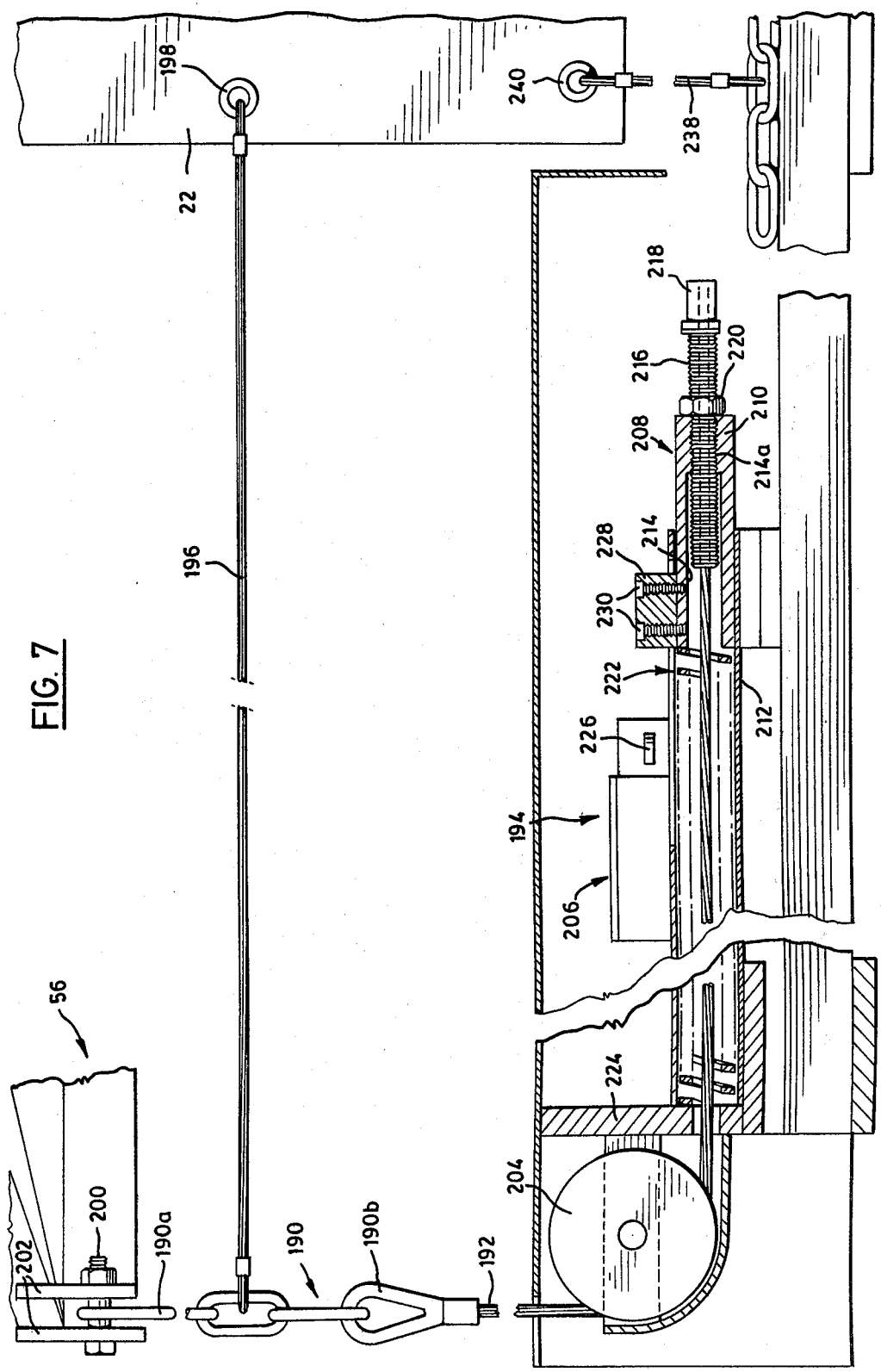
FIG. 7 is a detail view, partly in section of the lower left-hand portion of the screen assembly as seen in FIG. 1; and, FIG. 8 is a planar sectional view (with background omitted) of the screen storage trough of the assembly, the section being taken generally on line VII—VII of FIG. 1 and the screen being shown stowed.

As indicated above, a screen storage trough or trench 36 is provided for receiving the screen in its collapsed configuration. The screen is shown in this configuration in FIG. 8 as seen in the direction of arrows VII—VII in FIG. 1. FIG. 7 on the other hand is a view taken in a direction at right angles to FIG. 8 (i.e. in the same direction as FIG. 1) and shows the lower left-hand corner portion of the screen 22. FIG. 7 also shows part of the left-hand elongate tensioning element (not visible in FIG. 1) and one of the lateral tensioning members extending between that element and the screen 22. The elongate tensioning element takes the form of a chain 190 connected at its upper end to beam 56 and at its lower end to a cable 192 which is then itself connected to a tension limiting device 194 mounted in the bottom of the screen storage trough 36. Another similar device is provided at the opposite end of the screen but has not been shown since it is essentially a duplicate of device 194. The lateral tensioning member shown in FIG. 7 is denoted 196 and takes the form of a wire rope or cable formed at its ends with respective loops, one of which engages one of the links of chain 190 and the other of which extends through an opening in screen 22. The opening is provided with a grommet 198 for strengthening purposes. The other lateral tensioning members are essentially the same but of different lengths and have not been shown in FIG. 7 for ease of illustration. Chain 190 and cable 192 are shown broken above and below member 196 respectively to indicate indefinite length. The topmost link of the chain, denoted 190a is secured to beam 56 by a bolt 200 which extends through holes in two parallel plates 202 welded to the end of beam 56 and through link 190a. At its lower end, chain 190 is fitted with a connector 190b to which the length of cable denoted 192 is coupled. Cable 192 then extends downwardly and around a pulley 204 by which it is directed laterally to the tension limiting device 194.

Device 194 essentially comprises a spring-biassed stop member and a limit switch arranged to be operated when the stop member has been displaced through a predetermined distance corresponding to the fully tensioned position of the screen. The limit switch is denoted 206 and the stop member 208. Stop member 208 includes a square section body 210 which forms a slide and which is received in a complementarily shaped housing 212. Slide 210 is formed with an axial passageway 214 which is screw-threaded adjacent its outer end as indicated at 214a. The screw-threaded portion of this passageway receives a screw-threaded rod 216 which also has an axial passageway. Housing 212 and stop member 208 are arranged so that the cable 192 extends axially through the housing and through the passageway in the rod 216. At its outer end, the cable is provided with a swaged button or head at 218. A locknut 220 on rod 216 bears against the outer end face of slide 210. A compression spring 222 bears against the opposite end face of slide 210 and extends through housing 212 to an end wall defined by an upright plate 224.

It will be appreciated from the foregoing that an increase in tension in chain 190 caused by lifting beam 56 will have the effect of tending to draw slide 210 into housing 212 against the biassing effect of compression spring 222. Limited adjustment of the resistance provided by spring 222 can be achieved by releasing lock nut 220 and screwing rod 216 into or out of slide 210 depending on the adjustment required.

Limit switch 206 is supported at the side of housing 212 by a bracket (not shown) secured to the housing. The limit switch has an actuating lever (not visible) fitted with a roller 226 at its outer end and is essentially similar to the limit switches shown in FIG. 6. A limit switch actuator in the form of a metal block 228 is secured to slide 210 by bolts 230. The block is positioned to displace roller 226 and actuate limit switch 206 as slide 210 moves to the left in FIG. 7 under the influence of increasing tension in chain 190.

A similar limit switch is provided in the tensioning limiting device at the other side of the screen (not shown) and the lateral tensioning members at both sides will be adjusted so that the screen is laterally tensioned to the appropriate extent when it is fully tensioned in the vertical direction. The two limit switches are coupled in the electrical supply circuit to the winch 122 of the lifting mechanism so that the winch will stop when either limit switch is operated indicating that the screen has reached its fully erected position.

Thus, as was explained in connection with FIG. 1, the elongate tensioning elements (42; 190) at the respective sides of the screen adopt the shape of a catenary curve and the lateral tensioning members (44; 196) extend between the elongate elements and the screen so that increasing tension in the elongate elements tending to flatten the respective catenary curves will cause the lateral tensioning members to tension the screen in the lateral direction. Accordingly, assuming that the vertical tensioning elements and the lateral tensioning members are correctly adjusted, a signal from either limit switch 206 or from the corresponding switch at the other side of the screen will indicate proper vertical and lateral tensioning of the screen. In case of failure of these switches, the limit switches 152 (FIG. 6) perform a safety override function.

FIG. 7 also illustrates part of the anchoring means for the lower margin of the screen 22; the anchoring means are also visible in FIG. 8 and take the form of a pair of box section members 232 welded together side by side and to a series of base plates which are spaced longitudinally of the screen storage trough and one of which is indicated at 234. The base plates are anchored to the bottom wall of the trough by conventional anchor bolts (not shown) which extend through the plates and into the trough floor. A metal chain 236 extends longitudinally of the members 232 and is welded to the members with the links of the chain alternately inclined in opposite directions as can best be seen from FIG. 8. The chain links then present multiple anchoring points to any of which the screen can be secured. Referring back to FIG. 7, it will be seen that the screen is secured to the chain by a series of cables, one of which is indicated at 238, each having at its end, loops engaged with a link of the chain and in an opening formed along the lower marginal portion of screen 22. The opening is indicated at 240 and is fitted with a reinforcing grommet.

Referring now to FIG. 8 a screen storage trough 36 is formed by an open-topped recess or trench in the floor of the building in which the screen is to be erected. The floor surface is denoted by reference numeral 24 and the bottom of the trench is denoted 242. Side walls 244 and 246 and end walls, one of which is denoted 248 are erected in the trench and the whole of the trench is lined with carpet 249 so as to minimize the risk of damaging the screen.

In FIG. 8, screen 22 is shown loosely folded in concertina fashion in the trough 36. This is the "collapsed" configuration of the screen. The backdrop 86 is folded in similar fashion behind the screen. It has been found in practice that the screen and backdrop tend to fall naturally into this configuration when the beam 56 is lowered from its top position in which the screen is fully extended. Of course, manual assistance can be provided if necessary to properly fold the screen. In any event, when beam 56 reaches a position slightly higher than the position in which it is shown in FIG. 8, support bars, one of which is denoted 252 are inserted through the sleeves 112 (FIG. 2) at the top of the beam. These bars are dimensioned to rest with their ends on the tops of the side walls 244 and 246 of the screen storage trough so that the beam is suspended in the trough and remains clear of the folded screen. When the beam is properly supported in this position, the lifting eyes at the lower ends of the cables 40, as eye 134, are released from the hooks on the beams and the cables are retracted to the stowed positions within the housings 138 in the ceiling (FIG. 6). Conversely, when the screen is to be erected, the cables 40 are lowered until the lifting eyes 134 can be engaged with the hooks on the beam, whereupon the beam is raised, the support bars 252 are removed, and the screen can be erected. A suitable cover (not shown) will normally be provided across the top of the screen storage trough when the trough is not in use.

It will of course be appreciated that the preceding description relates to a preferred embodiment of the invention only and that many modifications are possible within the broad scope of the invention. For example, while it has been found convenient to employ elongate tensioning elements in the form of chains, for ease of attachment of the lateral tensioning members, there is no limitation in this respect. Cables could of course be used. Similarly, the lower margin of the screen could be anchored in other ways and need not even be anchored inside the screen storage means. In other embodiments, it might be possible to anchor the elongate tensioning elements directly to the floor surface rather than to tension limiting devices as disclosed. Conversely, at their upper ends, the elongate tensioning elements could perhaps be connected directly to the lifting mechanism rather than to a lifting beam as disclosed. The beam itself could be of considerably lighter construction for smaller screens or might even possibly be omitted entirely for some applications, (in which case the lifting means would be connected directly to the screen). Where a beam is provided, it can of course be straight or it may be curved where a cylindrical screen is required.

The beam supporting bars 252 and associated tubes 112 (FIG. 8) may be replaced by relatively long tubes or bars pivotted to the beam for movement between inoperative positions in which they extend generally longitudinally of the beam when the screen is erected, and operative positions in which they project laterally of the beam (generally as bars 252) for supporting the beam when the screen is stowed.

Permanent screen storage means need not be provided. For example, the screen could be stored in a box or other container which can be moved away for storage, e.g. lifted to the ceiling. The container could be designed to be removable with the screen stowed therein. The screen would then have to be releasable from its anchoring means.

A further possible modification would be to provide additional means for laterally displacing the ends of the elongate (catenary) tensioning elements for additional fo the tension in the screen. This could be achieved, for example, by tensioning devices arranged at the upper and/or lower ends of the elongate tensioning elements and arranged to move those ends outwardly away from the screen.

It should also be noted that, although the preceding specific description refers to a stowable projection screen assembly, in its broadest aspect, the invention is not limited to a stowable screen but could be used to control the tension in a permanent screen.

Finally it is to be understood that screens in accordance with the invention may be used not only with IMAX (registered trade mark) movie projectors but also with movie projectors and still projectors of other types.

I claim:

1. A stowable projection screen assembly comprising:
 a screen of flexible sheet material capable of adopting an extended configuration in which a surface of the screen is exposed for receiving a projected image, and a collapsed configuration in which the screen can be stowed, the screen having upper and lower margins and lateral side margins;
 means for anchoring said lower margin of the screen;
 lifting means adapted to be mounted in an overhead position above said anchoring means and to be releasably coupled to said upper margin of the screen, said lifting means being operable to raise the screen into said extended configuration and to tension the screen in a generally vertical direction; and,
 lateral tensioning means comprising respective elongate tensioning elements each substantially coextensive with and spaced from one of said lateral side margins of the screens, and a plurality of lateral tensioning members spaced along said lateral screen margins and extending between the screen and said elongate elements, said lateral tensioning members along each screen side margin being of progressively decreasing length in directions extending inwardly from said upper and lower margins of the screen so that the elongate tensioning elements each adopt the general shape of a catenary curve when the screen is extended, said elongate tensioning elements and lateral tensioning members being arranged so that tensioning of the screen in the vertical direction by said lifting means will cause a consequent increase in tension in said elongate elements tending to flatten said catenary curves and tension the screen in opposed lateral directions.

2. An assembly as claimed in claim 1, further comprising a beam from which said screen is suspended, the beam extending over substantially the entire width of the screen, said lifting means being adapted to be coupled to the upper margin of the screen by way of said beam, and wherein said elongate tensioning elements extend between the beam and said anchoring means so that lifting of the beam by the lifting means will cause said increase in tension in the elongate elements.

3. An assembly as claimed in claim 2, wherein said lifting means comprises a plurality of elongate lifting elements adapted to be coupled to said beam at a plurality of positions spaced along its length, a winch, and means coupling said winch and said lifting elements so that the elements can be raised and lowered together upon operation of said winch.

4. As assembly as claimed in claim 3, wherein each said lifting element has an outer end adapted to be coupled to said beam and incorporates adjacent said end, a weight for assisting proper lowering of the lifting element, and wherein the assembly further comprises a housing for said end portion of each lifting element including said weight, said housings being adapted to be mounted above a ceiling structure in a building in which the assembly is installed so that the weights can be withdrawn into said housings and substantially concealed from view.

5. An assembly as claimed in claim 4, further comprising, in association with each said housing, first and second limit switch means coupled to said lifting means, said first limit switch means being a safety override switch and including an actuating probe positioned for contact by said beam in the event that the beam is raised beyond the position in which the screen is fully extended, said first limit switch means remaining unactuated when the lifting element is raised without the beam, and said second limit switch means being adapted to be actuated by said weight when the weight has been withdrawn into said housing, said limit switches being adapted, when operated, to stop said lifting means.

6. An assembly as claimed in claim 1, wherein said elongate tensioning elements comprise respective chains and said lateral tensioning members extend between the screen and appropriate links of said chains.

7. An assembly as claimed in claim 1, wherein said anchoring means includes respective tension limiting devices to which said elongate tensioning elements are coupled, said devices being adjustable to control the maximum tension produced in each element upon operation of said lifting means.

8. An assembly as claimed in claim 7, wherein each said tension limiting device includes a spring-biassed stop to which the associated elongate tensioning element is coupled so that increasing tension in said element tends to move the stop against said spring biassing, and wherein each said device further includes limit switch means adapted to sense displacement of said stop through a predetermined distance against said spring biassing corresponding to proper tensioning of the screen in said extended configuration, said limit switch means being coupled to said lifting means to thereupon prevent further lifting of the screen.

9. An assembly as claimed in claim 1, wherein said screen storage means comprises a trough adapted to be disposed below a floor surface in a building in which said screen assembly is used, wherein said anchoring means is adapted to be secured to a bottom surface of said trough, and wherein the assembly further comprises means adapted to suspend said screen in said collapsed condition within said trough so as to minimize creasing of the screen.

10. A projection screen assembly comprising:

a screen of flexible sheet material capable of being tensioned in an extended configuration in which a surface of the screen is exposed for receiving a projected image, the screen having upper and lower margins and lateral side margins and being anchored at said lower margin;

lifting means supported above the screen and coupled to said upper margin thereof, said lifting means being operable to tension the screen in a generally vertical direction; and, lateral tensioning means comprising respective elongate tensioning elements each substantially co-extensive with and spaced from one of said lateral side margins of the screen, and a plurality of lateral tensioning members spaced along said lateral screen margins and extending between the screen and said elongate elements, said lateral tensioning members along each screen side margin being of progressively decreasing length in directions extending inwardly from said upper and lower margins of the screen so that the elongate tensioning elements each adopt the general shape of a catenary curve when the screen is extended, said elongate tensioning elements and lateral tensioning members being arranged so that tensioning of the screen in the vertical direction by said lifting means will cause a consequent increase in tension in said elongate elements tending to flatten said catenary curves and tension the screen in opposed lateral directions.

* * * * *

UNITED STATES PATENT OFFICE
CERTIFICATE OF CORRECTION

Patent No. 4,406,519         Dated September 27, 1983

Inventor(s) William C. Shaw

It is certified that error appears in the above-identified patent and that said Letters Patent are hereby corrected as shown below:

Claim 9, line 1 change "wherein said" to -- further comprising -- and after "screen storage means" change "comprises" to -- in the form of --.

Signed and Sealed this

Seventeenth Day of July 1984

[SEAL]

Attest:

Attesting Officer

GERALD J. MOSSINGHOFF

Commissioner of Patents and Trademarks